US011051327B2

(12) United States Patent
Hosseini et al.

(10) Patent No.: US 11,051,327 B2
(45) Date of Patent: Jun. 29, 2021

(54) RATE-MATCHING AROUND CRS FOR NR-TDD

(71) Applicant: QUALCOMM Incorporated, San Diego, CA (US)

(72) Inventors: Seyedkianoush Hosseini, San Diego, CA (US); Peter Gaal, San Diego, CA (US); Huilin Xu, San Diego, CA (US); Wanshi Chen, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/537,422

(22) Filed: Aug. 9, 2019

(65) Prior Publication Data

US 2020/0053758 A1 Feb. 13, 2020

Related U.S. Application Data

(60) Provisional application No. 62/717,440, filed on Aug. 10, 2018.

(51) Int. Cl.
*H04W 72/12* (2009.01)
*H04W 72/04* (2009.01)
(Continued)

(52) U.S. Cl.
CPC ....... *H04W 72/1273* (2013.01); *H04L 5/0051* (2013.01); *H04L 5/10* (2013.01); *H04W 72/0446* (2013.01); *H04W 72/14* (2013.01)

(58) Field of Classification Search
CPC ......... H04W 72/1273; H04W 72/0446; H04W 72/14; H04W 88/06; H04W 16/14;
(Continued)

(56) References Cited

U.S. PATENT DOCUMENTS

2018/0192404 A1* 7/2018 Maaref ................. H04L 5/0048
2019/0357264 A1* 11/2019 Yi ........................... H04L 5/001

FOREIGN PATENT DOCUMENTS

WO WO-2018128426 A1 7/2018
WO WO-2019005560 A1 * 1/2019 ........... H04L 5/0053

OTHER PUBLICATIONS

International Search Report and Written Opinion—PCT/US2019/046230—ISA/EPO—dated Jan. 2, 2020.

(Continued)

*Primary Examiner* — Shailendra Kumar
(74) *Attorney, Agent, or Firm* — QUALCOMM Incorporated

(57) ABSTRACT

Rate-matching and channel estimation are disclosed for new radio (NR) user equipments (UEs). An NR UE obtains coexistence information of neighboring legacy operations including common reference signal (CRS) ports, CRS frequency pattern, and a legacy subframe type corresponding to the NR transmission segments. The NR UE determines legacy CRS occasion(s) coinciding with shared downlink direction operations for the NR and legacy operations, and rate-matches reception of NR downlink transmissions around the CRS occasion(s). In other aspects, an NR UE detects overlap of a downlink signal with downlink control channel candidate of a configured control resource set (CORESET). The UE ends monitoring of the candidate within a search space of the CORESET in response to the detected overlap, detects a collision between a scheduled demodulation reference signal (DMRS) and the downlink signal occasion, and discards all or part of the CORESET.

33 Claims, 9 Drawing Sheets

(51) Int. Cl.
　　　*H04W 72/14*　　(2009.01)
　　　*H04L 5/00*　　　(2006.01)
　　　*H04L 5/10*　　　(2006.01)

(58) Field of Classification Search
　　　CPC ....... H04L 5/0051; H04L 5/10; H04L 5/0091;
　　　　　　　　　　　　　　H04L 5/1469; H04L 5/005
　　　See application file for complete search history.

(56) References Cited

OTHER PUBLICATIONS

Partial International Search Report—PCT/US2019/046230—ISA/EPO—dated Oct. 30, 2019.

\* cited by examiner

RATE-MATCHING AROUND CRS FOR NR-TDD

CROSS-REFERENCE TO RELATED APPLICATIONS

This application claims priority to U.S. Provisional Application No. 62/717,440, entitled "RATE-MATCHING AROUND CRS FOR NR-TDD," filed Aug. 10, 2018, the disclosure of which is hereby incorporated herein by reference.

BACKGROUND

Field

Aspects of the present disclosure relate generally to wireless communication systems, and to rate-matching around common reference signals (CRS) for new radio (NR) time division duplex (TDD) operations.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

Moreover, advanced radio access technologies (RATs) may be deployed as costs permit, placing advanced RATs among legacy RATs. In order to minimize the impact on users, as seen from the UE perspective, the coexistence of the difference RATs may be planned in such a manner to reduce the negative impact of the different technologies on the legacy UEs.

SUMMARY

In one aspect of the disclosure, a method of wireless communication includes obtaining, by a user equipment (UE) operating according to a new radio (NR) radio access technology (RAT), coexistence information associated with neighboring wireless operations according to a legacy RAT coexisting with the NR RAT, wherein the coexistence information includes a number of ports associated with reference signals of the legacy RAT, a frequency pattern of the reference signals of the legacy RAT, and a subframe type of corresponding subframes of the legacy RAT with transmission segments of the NR RAT, determining, by the UE, one or more reference signal occasions of the legacy RAT coinciding with shared downlink direction communication for the NR RAT and legacy RAT, and rate-matching, by the UE, reception of NR downlink transmissions within the shared downlink direction communication around the one or more reference signal occasions.

In an additional aspect of the disclosure, an apparatus configured for wireless communication includes means for obtaining, by a UE operating according to a NR RAT, coexistence information associated with neighboring wireless operations according to a legacy RAT coexisting with the NR RAT, wherein the coexistence information includes a number of ports associated with reference signals of the legacy RAT, a frequency pattern of the reference signals of the legacy RAT, and a subframe type of corresponding subframes of the legacy RAT with transmission segments of the NR RAT, means for determining, by the UE, one or more reference signal occasions of the legacy RAT coinciding with shared downlink direction communication for the NR RAT and legacy RAT, and means for rate-matching, by the UE, reception of NR downlink transmissions within the shared downlink direction communication around the one or more reference signal occasions.

In an additional aspect of the disclosure, a non-transitory computer-readable medium having program code recorded thereon. The program code further includes code to obtain, by a UE operating according to a NR RAT, coexistence information associated with neighboring wireless operations according to a legacy RAT coexisting with the NR RAT, wherein the coexistence information includes a number of ports associated with reference signals of the legacy RAT, a frequency pattern of the reference signals of the legacy RAT, and a subframe type of corresponding subframes of the legacy RAT with transmission segments of the NR RAT, code to determine, by the UE, one or more reference signal occasions of the legacy RAT coinciding with shared downlink direction communication for the NR RAT and legacy RAT, and code to rate-match, by the UE, reception of NR downlink transmissions within the shared downlink direction communication around the one or more reference signal occasions.

In an additional aspect of the disclosure, an apparatus configured for wireless communication is disclosed. The apparatus includes at least one processor, and a memory coupled to the processor. The processor is configured to obtain, by a UE operating according to a NR RAT, coexistence information associated with neighboring wireless operations according to a legacy RAT coexisting with the NR RAT, wherein the coexistence information includes a number of ports associated with reference signals of the legacy RAT, a frequency pattern of the reference signals of the legacy RAT, and a subframe type of corresponding subframes of the legacy RAT with transmission segments of the NR RAT, to determine, by the UE, one or more reference signal occasions of the legacy RAT coinciding with shared downlink direction communication for the NR RAT and legacy RAT, and to rate-match, by the UE, reception of NR downlink transmissions within the shared downlink direction communication around the one or more reference signal occasions.

In an additional aspect of the disclosure, a method of wireless communication includes detecting, by a user equipment (UE) operating according to a new radio (NR) radio access technology (RAT), an overlapping portion of at least one resource element of a downlink control channel candidate of a configured control resource set (CORESET) overlaps with at least one resource element of a downlink signal occasion of the NR RAT or a neighboring legacy RAT coexisting with the NR RAT. The method additionally includes ending, by the UE, a monitoring of the downlink control channel candidate within a search space of the configured CORESET in response to the detected overlapping portion. The method also includes detecting, by the UE, a collision between a scheduled demodulation reference signal (DMRS) within the overlapping portion and the downlink signal occasion, and discarding, by the UE, at least a portion of the CORESET in response to the detected collision.

In an additional aspect of the disclosure, an apparatus configured for wireless communication includes means for detecting, by a user equipment (UE) operating according to a new radio (NR) radio access technology (RAT), an overlapping portion of at least one resource element of a downlink control channel candidate of a configured control resource set (CORESET) overlaps with at least one resource element of a downlink signal occasion of the NR RAT or a neighboring legacy RAT coexisting with the NR RAT. The apparatus additionally includes means for ending, by the UE, a monitoring of the downlink control channel candidate within a search space of the configured CORESET in response to the detected overlapping portion. The apparatus also includes means for detecting, by the UE, a collision between a scheduled demodulation reference signal (DMRS) within the overlapping portion and the downlink signal occasion, and means for discarding, by the UE, at least a portion of the CORESET in response to the detected collision.

In an additional aspect of the disclosure, a non-transitory computer-readable medium having program code recorded thereon. The program code includes code to detect, by a user equipment (UE) operating according to a new radio (NR) radio access technology (RAT), an overlapping portion of at least one resource element of a downlink control channel candidate of a configured control resource set (CORESET) overlaps with at least one resource element of a downlink signal occasion of the NR RAT or a neighboring legacy RAT coexisting with the NR RAT. The program code additionally includes code to end, by the UE, a monitoring of the downlink control channel candidate within a search space of the configured CORESET in response to the detected overlapping portion. The program code also includes code to detect, by the UE, a collision between a scheduled demodulation reference signal (DMRS) within the overlapping portion and the downlink signal occasion, and discard, by the UE, at least a portion of the CORESET in response to the detected collision.

In an additional aspect of the disclosure, an apparatus configured for wireless communication is disclosed. The apparatus includes at least one processor, and a memory coupled to the processor. The processor is configured to detect, by a user equipment (UE) operating according to a new radio (NR) radio access technology (RAT), an overlapping portion of at least one resource element of a downlink control channel candidate of a configured control resource set (CORESET) overlaps with at least one resource element of a downlink signal occasion of the NR RAT or a neighboring legacy RAT coexisting with the NR RAT. The processor is additionally configured to end, by the UE, a monitoring of the downlink control channel candidate within a search space of the configured CORESET in response to the detected overlapping portion. The processor is also configured to detect, by the UE, a collision between a scheduled demodulation reference signal (DMRS) within the overlapping portion and the downlink signal occasion, and discard, by the UE, at least a portion of the CORESET in response to the detected collision.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
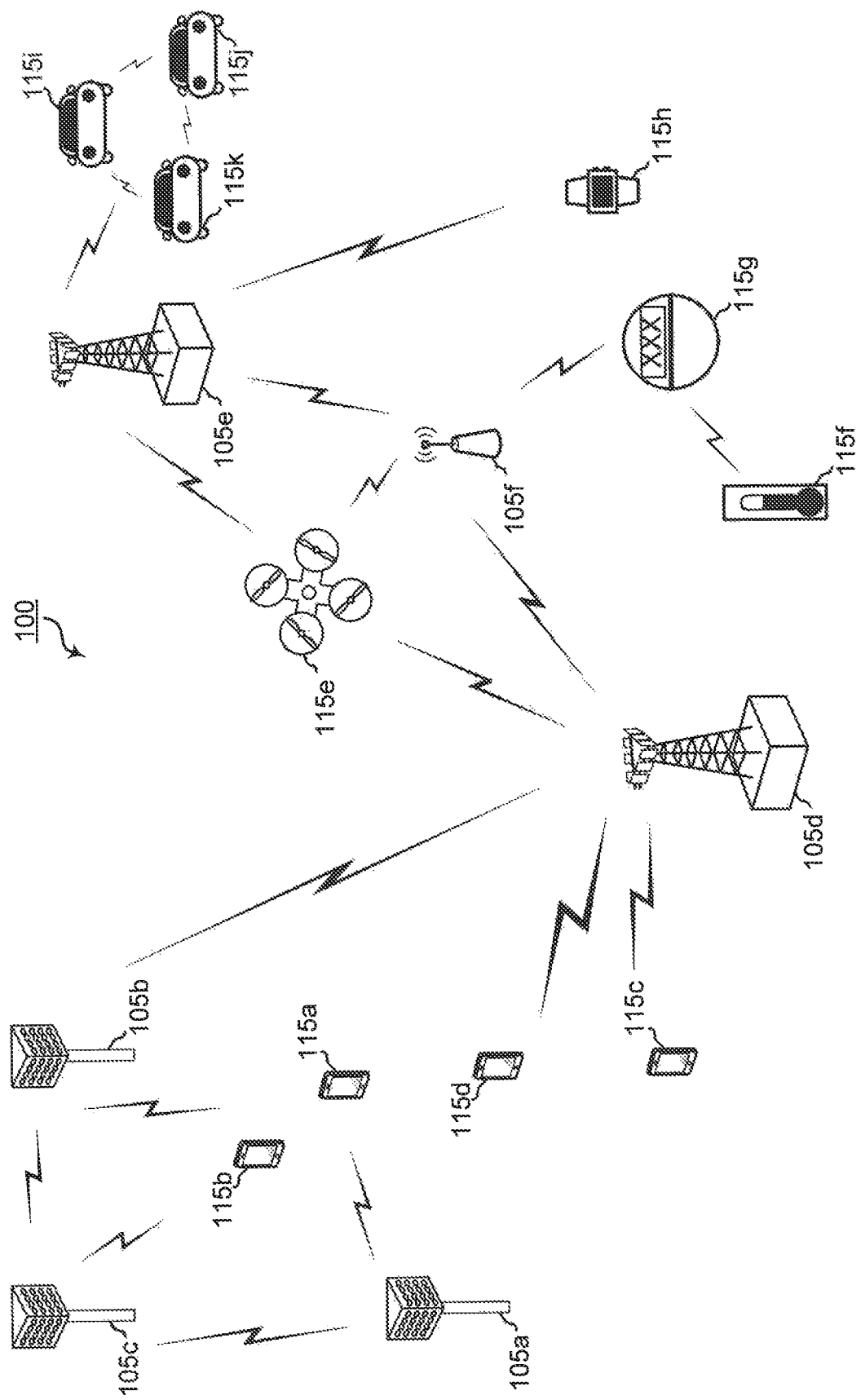
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

5G network 100 may also coexist with legacy RATs, such as LTE. For example, base station 105a participates in NR operations including with UE 115a, while base station 105d and UE 115d participate in LTE operations within the same vicinity and sharing at least downlink bands or component carriers. The downlink sharing of communication bands may be invisible to LTE UEs, such as UE 115d. The NR UE, UE 115a, determines, according to various aspects of the present disclosure, scheduling within LTE operations in order to rate-match around downlink signaling from base station 105d, including common reference signals (CRS), synchronization signal blocks (SSBs), and the like, when both NR and LTE operations share downlink direction access to the communication band. In order for the NR UE, UE 115a, to determine the allocated direction of the LTE subframe according to various aspects of the present disclosure, UE 115a may either receive the additional information, such as uplink/downlink configuration and special subframe format, to assist in determining the allocated LTE subframe direction, or may operate according to its own allocated slot direction corresponding to the LTE subframe, when no additional signaling is allowed. Once the corresponding LTE subframe is determined as a downlink direction, UE 115a may rate-match around scheduled downlink signal transmission.

Figure 2:
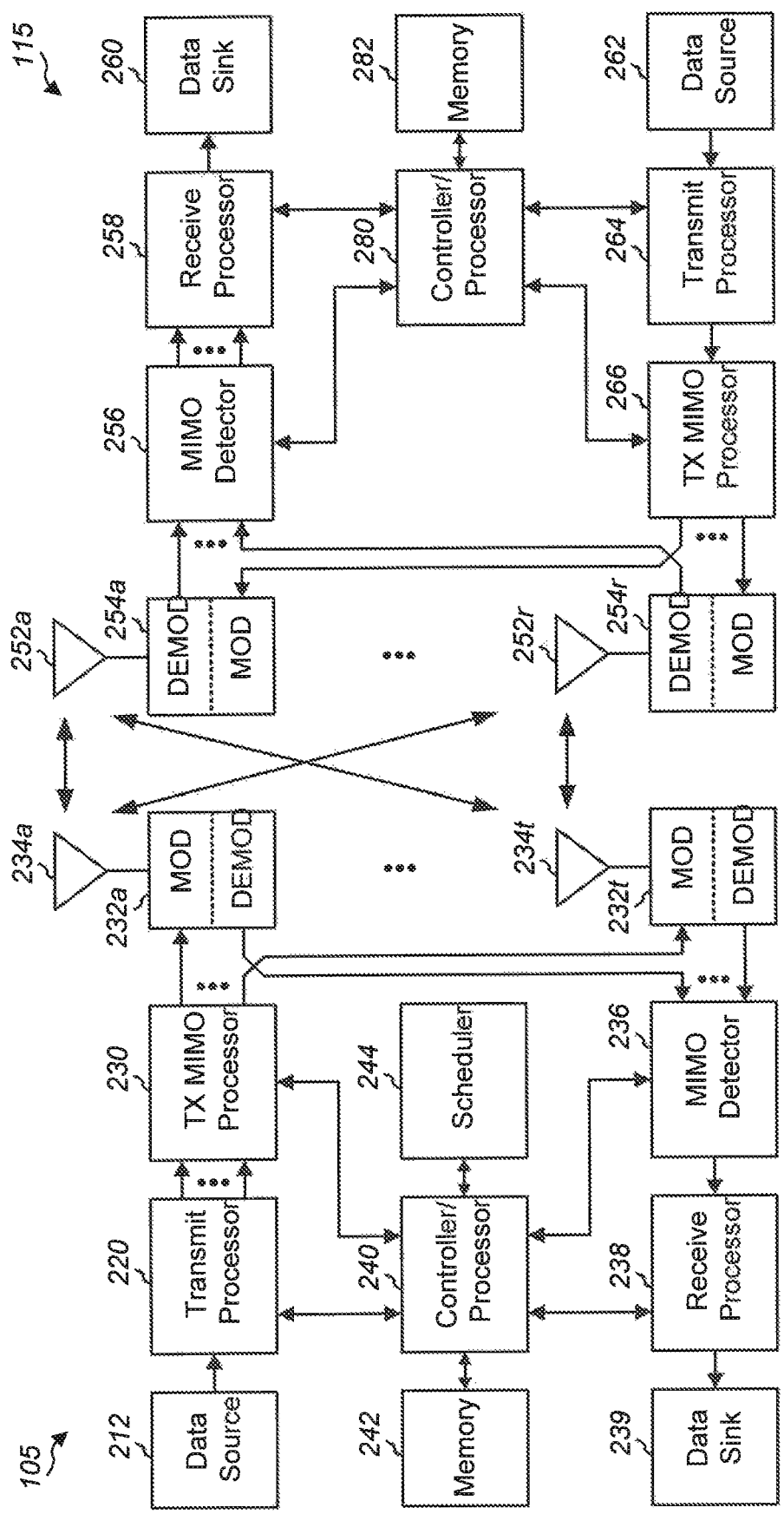
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 4 and 6, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/ negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
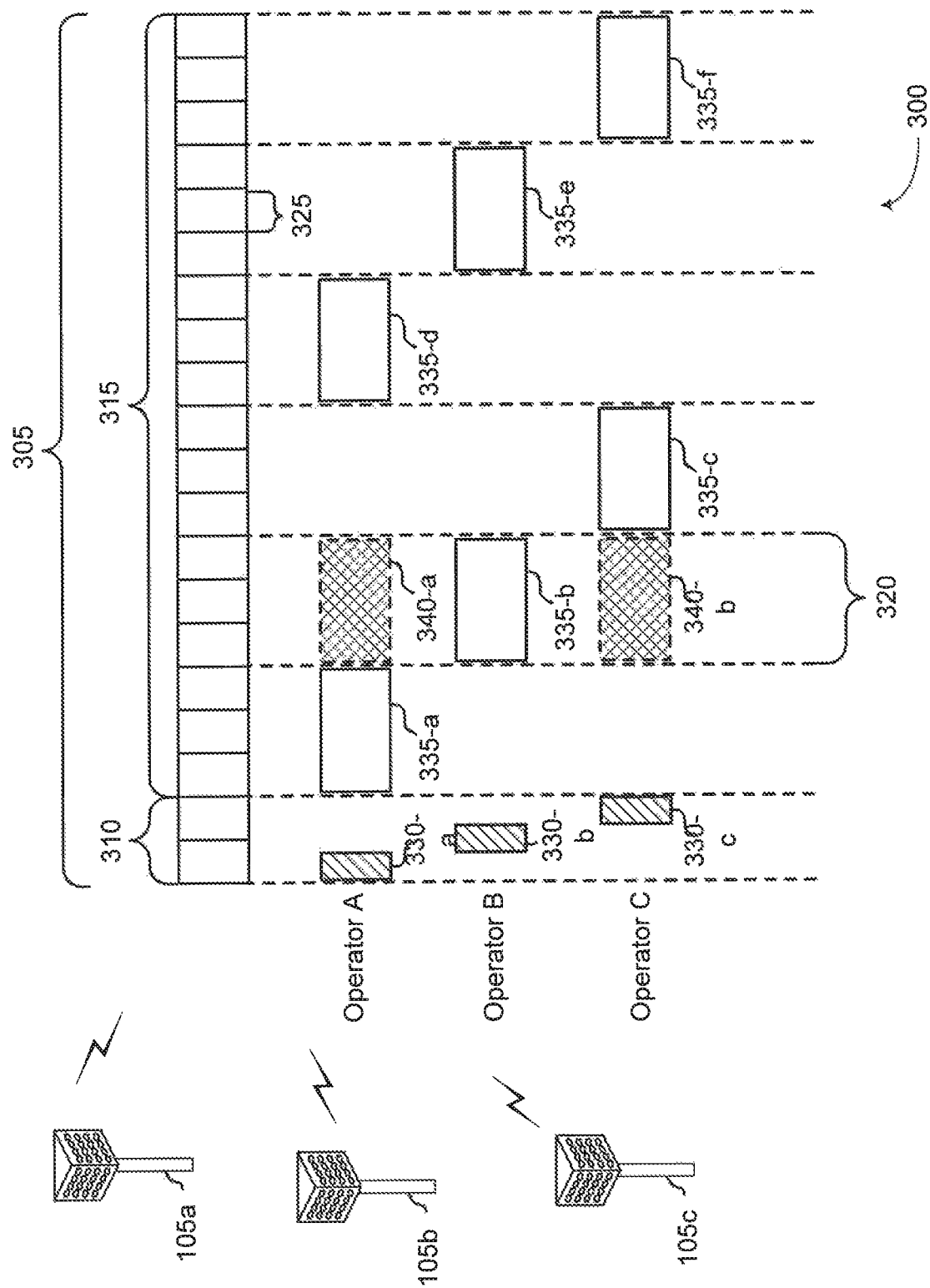
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g, UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

LTE and NR networks may co-exist over the same communication carrier (e.g., downlink band, component carrier, etc.). From the network perspective, the downlink resources may be shared with some considerations. For LTE operation, the UEs may not be impacted by the presence of NR communications. However, the NR downlink operations should rate-match around some of the LTE system downlink signals, such as common reference signal (CRS), channel state information (CSI) reference signals (CSI-RS), and the like. LTE and NR users may share resources and parameters, such as the number of CRS ports, the frequency shift values (e.g., v_shift values), and subframe types (e.g., MBSFN vs. non-MBSFN), through configuration. Thus, in frequency division duplex (FDD) bands, the NR users may be aware of the exact resource elements (REs) used for LTE CRS. However, without obtaining additional information exchange or defining proper UE behavior, NR UEs may not currently perform such rate-matching around CRS REs in time division duplex (TDD) bands. For example, in order to rate-match around LTE CRS, an NR UE should know the TDD downlink/uplink configuration, the special subframe (SSF) format, such as the number of downlink symbols (DwPTS), uplink symbols (UpPTS), and guard periods (GPs). Additionally, if enhanced interference mitigation and traffic adaptation (eIMTA) is supported, even more information would be useful for an NR user to rate-match around TDD CRS REs. Various aspects of the present disclosure provide for NR UEs to determine locations of TDD CRS REs for rate-matching.

Figure 4:
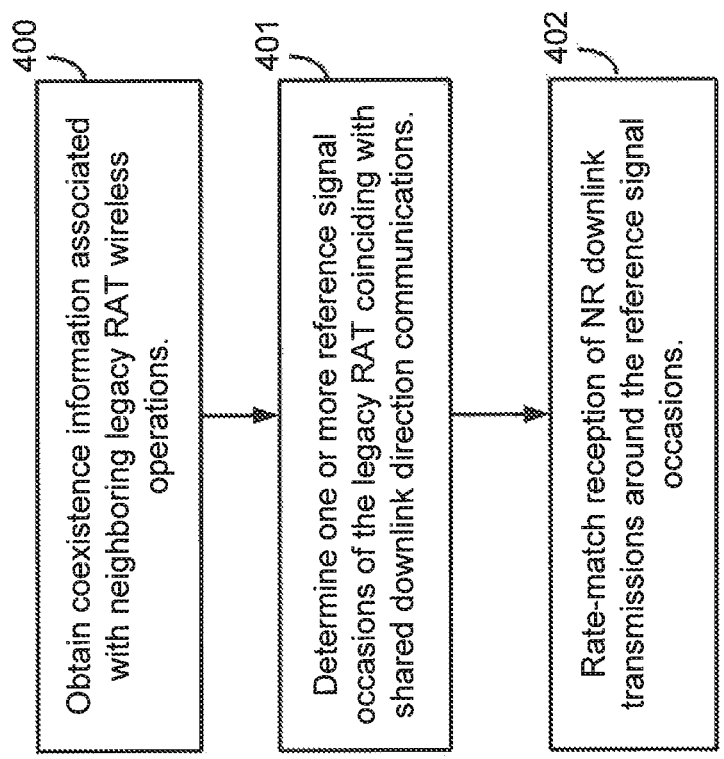
FIG. 4 is a block diagram illustrating example blocks executed to implement one aspect of the present disclosure.
Figure 8:
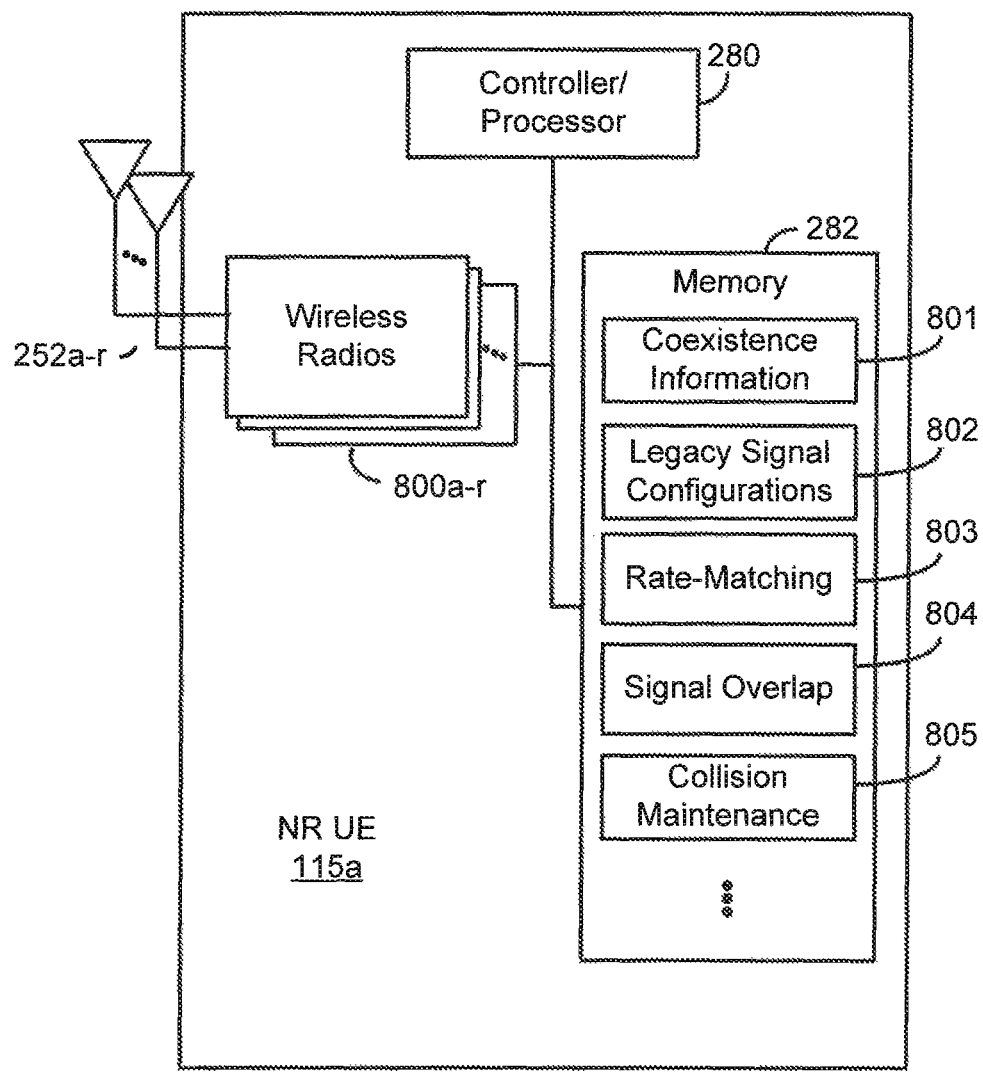
FIG. 8 is a block diagram illustrating an example NR UE configured according to one aspect of the present disclosure.

FIG. 4 is a block diagram illustrating example blocks executed to implement one aspect of the present disclosure. The example blocks will also be described with respect to NR UE 115a as illustrated in FIG. 8. FIG. 8 is a block diagram illustrating NR UE 115a configured according to one aspect of the present disclosure. NR UE 115a includes the structure, hardware, and components as illustrated for UE 115 of FIG. 2. For example, NR UE 115a includes controller/processor 280, which operates to execute logic or computer instructions stored in memory 282, as well as controlling the components of NR UE 115a that provide the features and functionality of NR UE 115a. NR UE 115B, under control of controller/processor 280, transmits and receives signals via wireless radios 800a-r and antennas 252a-r. Wireless radios 800a-r includes various components and hardware, as illustrated in FIG. 2 for UE 115, including modulator/demodulators 254a-r, MIMO detector 256, receive processor 258, transmit processor 264, and TX MIMO processor 266.

At block 400, an NR UE obtains coexistence information associated with neighboring legacy RAT wireless operations. In one example aspect, the legacy RAT may be LTE operations. The coexistence information may include parameters related to CRS, such as the number of ports associated with the CRS, the frequency shift pattern of the CRS (e.g., v_shift values), and a subframe type of the corresponding LTE subframes (e.g., multicast-broadcast single frequency network (MBSFN) subframes vs. non-MBSFN subframes). MBSFN subframes may only have CRS transmitted during the first symbol (symbol 0). NR UE 115a receives the coexistence information via antennas 252a-r and wireless radios 800a-r and stores the parameters, under control of controller/processor 280, in memory 282 at coexistence information 801.

At block 401, the NR UE determines one or more reference signal occasions of the legacy RAT coinciding with shared downlink direction communications. While the parameters known at coexistence information 801 provides enough information for NR UE 115a to identify locations of the downlink signals (e.g., CRS, CRS-RS, etc.) transmitted by an LTE base station operating in frequency division duplex (FDD) bands, NR UE 115a cannot specifically determine the location of downlink signal transmission occasions in time division duplex (TDD) bands without either obtaining additional information or specific UE behaviors to determine the reference signal transmission occasions with enough specificity to successfully rate match around. Accordingly, various aspects of the present disclosure determine the one or more reference signal occasions in TDD bands either through receipt of additional signaling or by defining such behaviors, such as presuming an LTE subframe direction based on the granted allocation direction for NR operations. NR UE 115a, under control of controller/processor 280, would use such additional signaling or UE behaviors in addition to the parameters in coexistence information 801 to determine the reference signal occasions of the legacy RAT (e.g., LTE).

At block 402, the NR UE rate-matches one or more reference signal occasions of the legacy RAT coinciding with shared downlink direction communications. After determining the locations of the one or more reference signal transmission occasions, NR UE 115a, under control of controller/processor 280, executes rate-matching logic 803, stored in memory 282.

The execution environment of rate-matching logic 803 controls NR UE 115a to rate-match any reception of NR downlink transmissions around the LTE downlink signals (e.g., CRS, CRS-RS, etc.).

Figure 5A:
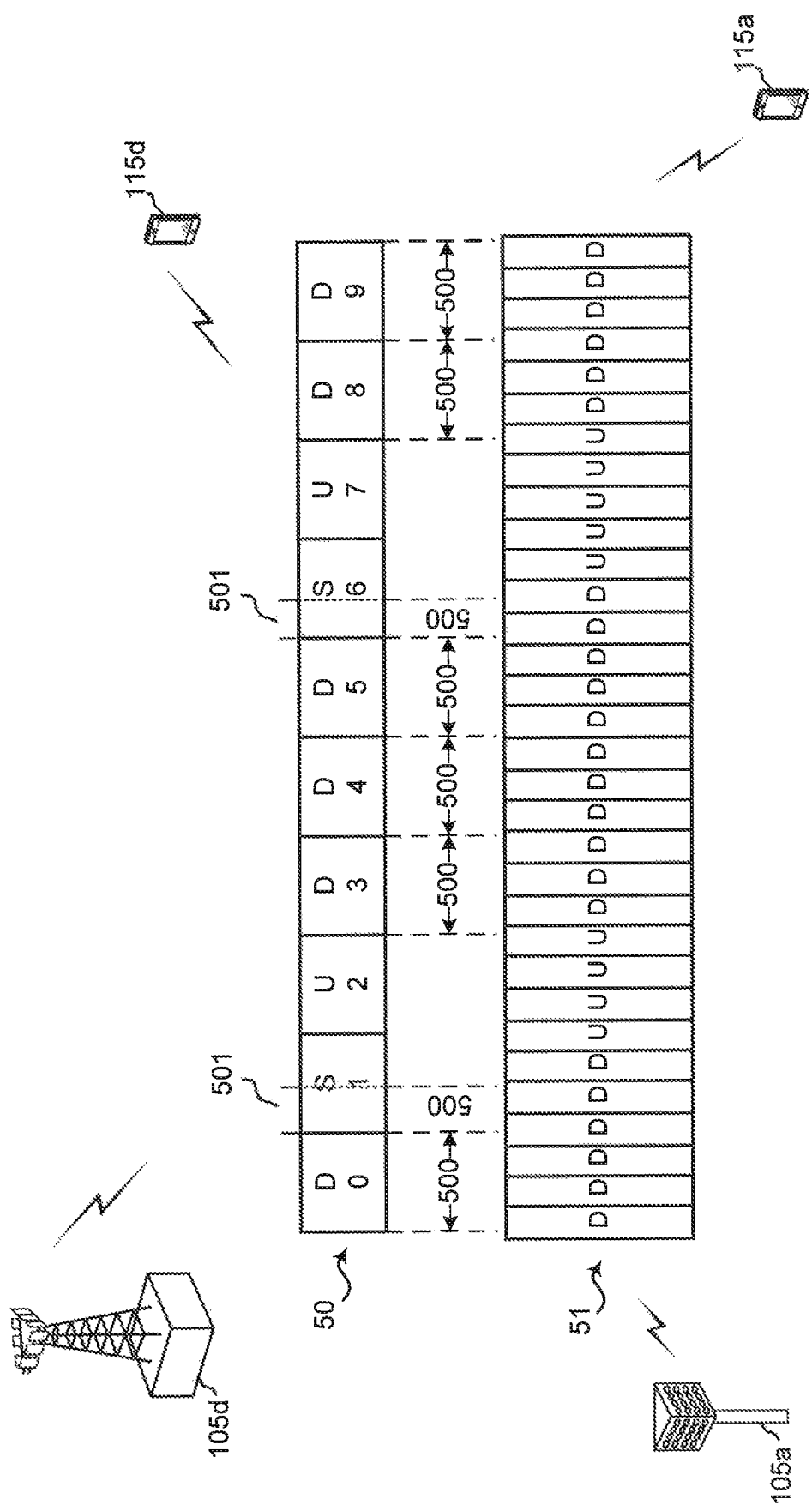
FIG. 5A is a block diagram illustrating an NR UE configured according to one aspect of the present disclosure.

FIG. 5A is a block diagram illustrating NR UE 115a configured according to one aspect of the present disclosure. NR UE 115a participates in communications using a 5G NR RAT via NR base station 105a (e.g., gNB). The communication stream 51, between NR UE 115a and base station 105a, coexists over the same band or component carriers as the legacy TDD LTE RAT communications via communication stream 50 between legacy UE 115d and legacy base station 105d. In order to reduce the impact of NR operations on any LTE operations between legacy UE 115a and legacy base station 105d, NR UE 115a would rate-match around some types of LTE downlink signals (e.g., CRS, CRS-RS, etc.).

Various aspects of the present disclosure provide for CRS rate-matching by NR UEs, such as NR UE 105a, in TDD bands, in which the NR UEs are either allowed to receive additional signaling or where no additional signaling is allowed. NR UE 115a would determine the shared downlink direction communication regions 500, in which LTE subframes are either configured in the downlink direction or, for special subframes, have downlink pilot time slot (DwPTS) symbols 501 corresponding to NR downlink configured transmission slots. Legacy base station 105 would have downlink signals scheduled, such as CRS, at predetermined locations, depending on the uplink-downlink configuration and special subframe format assigned. NR UE 105a may determine such predetermined locations and rate-match reception of NR downlink communications around such LTE downlink signaling.

Where additional signaling would be allowed, the TDD downlink/uplink configuration and SSF format can be indicated to NR UE 115a via radio resource control (RRC) signaling from NR base station 105a. Once this additional information is available to NR UE 115a, NR UE 115a can rate-match around the TDD CRS REs within shared downlink direction communication regions 500. In operation, the indication of additional signaling transmitted from NR base station 105a to NR UE 115a should be such that the NR UE 115a would know the mapping between the LTE subframes of communication stream 50 and the NR slots of communication stream 51, as well as the mapping between the MBSFN subframes and NR slots.

Figure 5B:
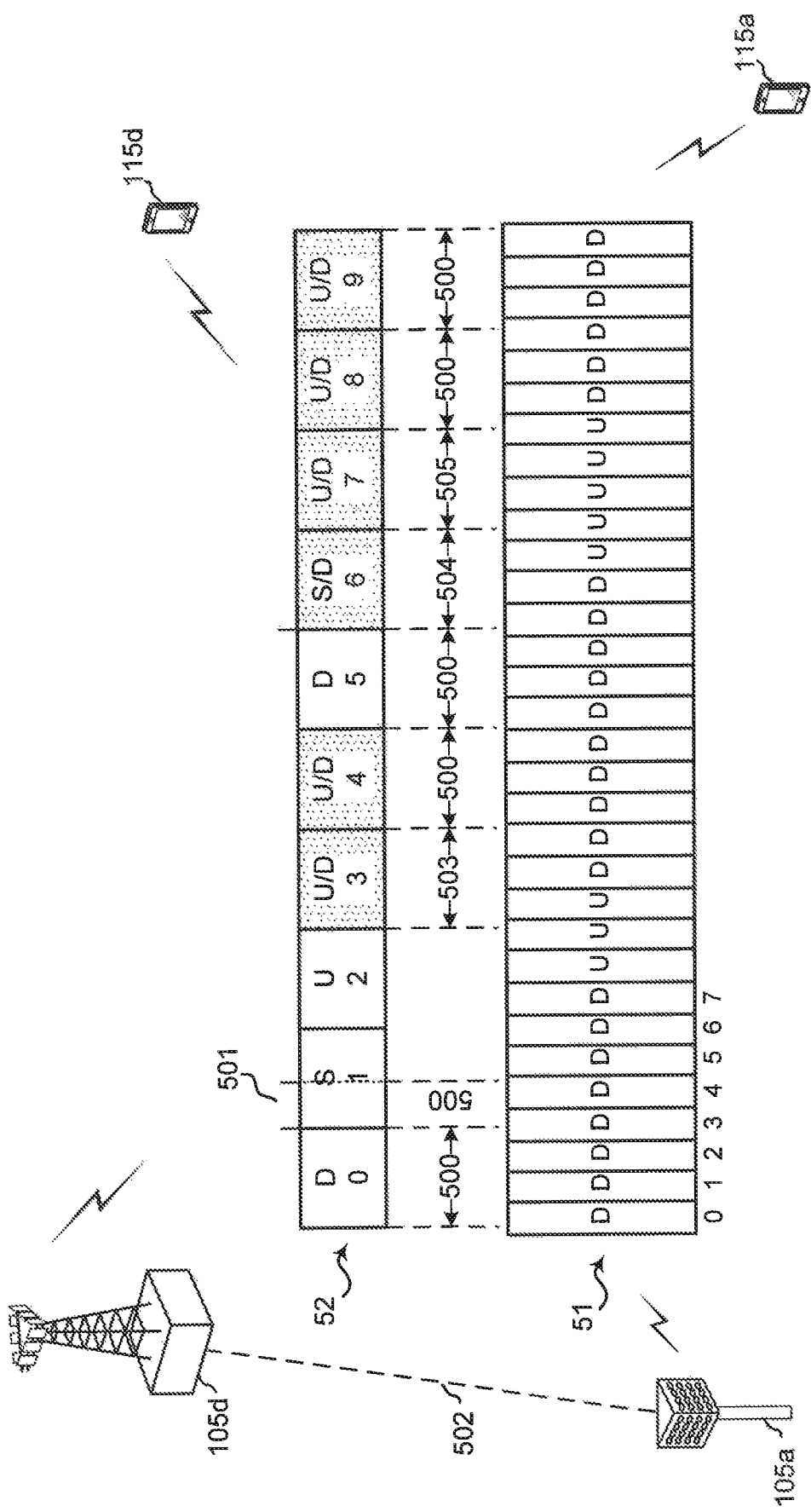
FIG. 5B is a block diagram illustrating an NR UE, configured according to one aspect of the present disclosure, operating in shared communication spectrum with LTE operations that support eIMTA.

FIG. 5B is a block diagram illustrating NR UE 115, configured according to one aspect of the present disclosure, operating in shared communication spectrum with LTE operations that support eIMTA. eIMTA, in general, allows a cell or cluster of cells to dynamically adapt uplink/downlink subframe resources based on the actual traffic needs. For example, cells can use downlink-heavy configurations when downlink traffic is heavy and uplink-heavy configurations when uplink traffic is heavy. For TDD eIMTA, these uplink/downlink configurations can be configured such that a baseline configuration (e.g., uplink-heavy) may be signaled using system broadcast signals (e.g., SIB, MIB), while updated configurations (e.g., downlink HARQ reference uplink/downlink configurations or downlink-heavy) may be semi-statically signaled using RRC. Moreover, uplink/downlink configuration changes may be dynamically signaled using layer 1 (L1) reconfiguration signals, such as via downlink control information (DCI) signals and the like.

It should be noted that according to eIMTA procedures uplink and special subframes can be dynamically reconfigured to downlink subframes, but downlink subframes may not be dynamically reconfigured to uplink or special subframes.

The communication stream, such as communication stream 52, configured to support eIMTA includes anchor subframes (e.g., subframes 0, 1, 2, and 5), which are common subframes across the baseline and updated configurations, and non-anchor subframes (e.g., subframes 3, 4, 6, 7, 8, and 9) which may adaptively change between special/uplink and downlink direction in response to dynamic L1 signaling. The direction or category of anchor subframes may not be dynamically changed. Where eIMTA is supported, even more information may be included or supplemented to the additional signaling solutions to allow NR UE 115a to identify and rate-match around LTE-based downlink signals (e.g., CRS, CRS-RS, etc.). For example, in LTE operations between legacy base station 105d and legacy UE 115d, legacy base station 105d broadcasts the baseline uplink/downlink configuration that identifies the direction of the subframes (e.g., uplink, downlink, or special) and identifies which of the subframes are anchor subframes and which are not. This baseline configuration may be broadcast within a system broadcast, such as SIB 1. As traffic conditions change, legacy base station 105d may semi-statically update the uplink/downlink configuration via RRC signaling. The semi-static update may update the underlying uplink/downlink configuration, including identification of anchor/non-anchor subframes and direction, or may simply update the direction of non-anchor subframes of the baseline configuration.

NR UE 115a may receive this baseline or semi-statically updated configuration information in order to understand which of the LTE subframes are anchor subframes, whose direction cannot be changed dynamically. However, at this stage, NR UE 115a may not be aware of any dynamic change of direction that has occurred in the non-anchor subframes. Various aspects of the present disclosure as illustrated in FIG. 5B provide for alternative options for indicating the dynamic change of directions over the non-anchor subframes to the NR users.

For example, in a first alternative aspect, NR UE 115a may monitor and decode the LTE group common PDCCH transmitted from legacy base station 105d. The LTE group common PDCCH, which may include L1 signaling, such as DCI, provides an indication of any dynamic direction changes for the non-anchor subframes (e.g., subframes 3, 4, 6, 7, 8, and 9). In a second alternative aspect, NR UE 115a may monitor and decode the NR PDCCH transmitted from NR base station 105a. This NR PDCCH specifically includes the dynamic signaling that identifies any dynamic change of direction of the non-anchor LTE subframes of communication stream 52. NR base station 105a may obtain the dynamic signaling information in a number of different ways, including via backhaul 502 directly from legacy base station 105d, or by monitoring and receiving the signaling from legacy base station 105d over the air.

A third alternative aspect provides for NR UE 115a to follow its own scheduling to determine the direction of the non-anchor subframes. Thus, when NR UE 115a receives an uplink grant or allocation for a slot within communication stream 51, it will assume the corresponding non-anchor subframe in communication stream 52 is also an uplink subframe in which case no rate-matching will be performed. Otherwise, when NR UE 115a receives a downlink grant or allocation for a slot within communication stream 51, it will assume the corresponding non-anchor subframe in communication stream 52 is a downlink subframe, thus, triggering the rate-matching around CRS REs in that downlink subframe.

Thus, in operations as illustrated in FIG. 5B according to one aspect of the present disclosure that allows additional signaling, NR UE 115a first receives signaling identifying the semi-static uplink/downlink configuration, which identifies the anchor and non-anchor subframes in communication stream 52. NR UE 115a may then obtain the dynamic signaling information, as described in one of the three alternative aspects above, to determine the current subframe category/direction for each of the non-anchor subframes in communication stream 52. NR UE 115a determines the shared downlink direction communication regions 500, in which both its slot direction of communication stream 51 and the subframe direction of communication stream 52 are downlink, and performs rate-matching around any LTE downlink signaling that may come from legacy base station 105d at known locations. As illustrated, the dynamic signaling identifies subframe 3 as an uplink direction, and subframes 4, 6, 7, 8, and, 9 as downlink direction. Thus, NR UE 115a will not perform rate-matching either in region 503, as subframe 3 is in an uplink direction, or, at least for the uplink slots of communication stream 51 within regions 504 and 505.

For downlink sharing in 5G NR operations, introduction of additional signaling may not be an option. In such cases, it may be possible for the NR UE to assume a DL/UL direction of the LTE operation, but in in other cases the direction of the LTE may not be assumed. Whether the NR UE performs rate matching may be based on the UL/DL direction of the NR operation and the assumed UL/DL or unknown direction of the LTE operation. For example, when the NR operation direction is UL and the assumed LTE operation direction is UL, then the NR UE does not perform rate matching. However, when the NR operation direction is UL and the assumed LTE operation direction is DL, then the NR UE does perform rate matching. When the NR operation direction is UL and the direction of the LTE operation is not known (e.g., in LTE SSF), then the NR UE may either perform rate matching or not perform rate matching. Additionally, when the NR operation direction is DL and the assumed LTE operation direction is DL, then the NR UE does perform rate matching. However, when the NR operation direction is DL and the assumed LTE operation direction is UL, then the NR UE does not perform rate matching. When the NR operation direction is DL and the direction of the LTE operation is not known, then the NR UE may either perform rate matching or not perform rate matching.

From the forgoing, it should be evident that the NR UE 115a may follow its own scheduling whether the LTE operation supports eIMTA, as in FIG. 5B or not, as in FIG. 5A. For example, when NR UE 115a receives an uplink grant over a given slot or a portion of a slot of communication stream 51, no rate-matching would be needed. Otherwise, where NR UE 115a receives a downlink grant over a given slot or a portion of a slot of communication stream 51, it assumes that the corresponding LTE subframe on communication stream 50 (non-eIMTA) or communication stream 52 (eIMTA) is also configured for downlink. Because downlink signals, such as CRS symbols, will be at a fixed location in both downlink subframes and the downlink portion of the special subframes, regardless of the special subframe format, NR UE 115a can rate-match around the assumed downlink signals.

In one example implementation illustrated in FIG. 5B, the NR downlink allocation of communication stream 51 spans over symbols 0-7. Regardless of whether this downlink allocation spans an LTE downlink subframe, such as subframe 0, or the downlink symbols of a special subframe, such as special subframe 1, CRS, for example, may be transmitted over symbols 0, 1, 4, 7, where a 3/4-port CRS is configured, or symbols 0, 4 and 7, where a 1/2-port CRS is configured. The consequence of this approach is that, even when the LTE portion is in uplink, NR UE 115 might still incorrectly assume a downlink direction based on its own scheduling and rate-match around non-existent CRSs. However, the complexity of operations within NR UE 115 is reduced without sacrificing an impact on the legacy LTE operations.

In another alternative aspect, generally, a base station may select the same or at least a similar downlink/uplink configuration for both NR and LTE operations for the purpose of facilitating downlink sharing. Referring back to FIG. 5A, when NR UE 115a does not receive any additional signaling for rate-matching purposes, it can compare its NR TDD slot configuration of communication stream 51 with the multiple available LTE TDD configurations. NR UE 115a may assume and identify the LTE TDD configuration that communication stream 50 is estimated to be configured with is the one that is most similar to its own NR TDD slot configuration. There may be differences in the configurations, such as where the special subframe (e.g., special subframes 1 and 6) may be located, but, according to the presently described example aspect, NR UE 115a will rate-match according to the joint direction, when the directions are the same between the NR and LTE configurations (e.g., rate-match when both directions are downlink and not rate-match when both directions are uplink), or according to the direction granted to NR UE 115a when the directions of both operations do not match. The described example aspect may be more efficient in operations that do not support eIMTA, as illustrated in FIG. 5A, as NR UE 115a would not perform rate-matching when LTE operations are not assumed in the downlink direction.

It should be noted that where the NR semi-static TDD slot configuration does not exactly match one of the available LTE TDD configurations, NR UE 115a may rate-match around the assumed CRS locations when the granted downlink for NR UE 115a is within the portion that is not matched with LTE TDD configuration.

Additional aspects of the present disclosure may provide different mechanisms for an NR UE, such as NR UE 115a, to determine the frame structure used by the LTE operations. For example, in a first alternative aspect without additional signaling, NR UE 115a (FIG. 5A) may derive the same frame structure (e.g., FDD, TDD, unlicensed spectrum, etc.) based on the band being used for the NR and LTE operations. NR UE 115a identifies the shared band or component carrier shared for NR and LTE operations. The identified band may, accordingly, be known to NR UE 115a to be associated with a particular frame structure (e.g., FDD, TDD, unlicensed, or the like).

A second alternative aspect may include the availability of additional signaling. In such alternative aspect, NR UE 115a may receive a signal that indicates the frame structure, and, if TDD, may still further include additional information to identify the TDD uplink/downlink configuration. Still further additional signaling for TDD frame structures may be used to indicate the special subframe format or to indicate particular configurations that impact CRS configurations. For example, instead of a signal indicating between 10 different special subframe configurations, the signal may indicate a subset of types of CRS configurations that would impact the CRS configuration (e.g., CRS in the first 3 control symbols, CRS up to first slot, CRS within the first 9 symbols, and CRS in the first 12 symbols). Signaling may also indicate that CRS is not present in special subframes (e.g., special subframe format #10, in which there are no CRS outside of the CRS in symbol 0). Thus, depending on the level of additional information to be included with regard to frame structure and the like, the additional signaling may include one or more bits to accommodate conveying the information.

In general, for sharing of downlink resources between NR and LTE operations, an NR UE will rate-match around LTE downlink signals, such as CRS, CSI-RS, and the like, in both FDD and TDD bands. In operations for PDCCH decoding, when the NR UE monitors a PDCCH candidate in a search space set occasion of a particular slot, if at least one RE of a PDCCH candidate on the serving cell overlaps with at least one RE allocated for downlink signals (e.g., NR synchronization signal block (SSB), LTE CRS, or the like), then the NR UE may not be required to monitor the PDCCH candidate any further in order to rate-match around the downlink signal. When the parameter identifying the precoder RB grouping (e.g., precoderGranularity) is set to be all contiguous RBs, all of the RBs in that given cluster may have the same precoding. In such a configuration, an NR UE will not expect to be configured with a set of resource blocks of a control resource set (CORESET) that includes more than four subsets of resource blocks that are not contiguous in frequency. A CORESET includes a collection of resource blocks over which the NR UE's search space is defined. Each CORESET may have up to four clusters when wideband demodulation reference signal (WB DMRS) is configured, in which each cluster comprises a number of consecutive resource blocks. The aforementioned precoder RB grouping parameter identifies a number of consecutive resource blocks in a cluster that may have the same precoding.

Figure 6:
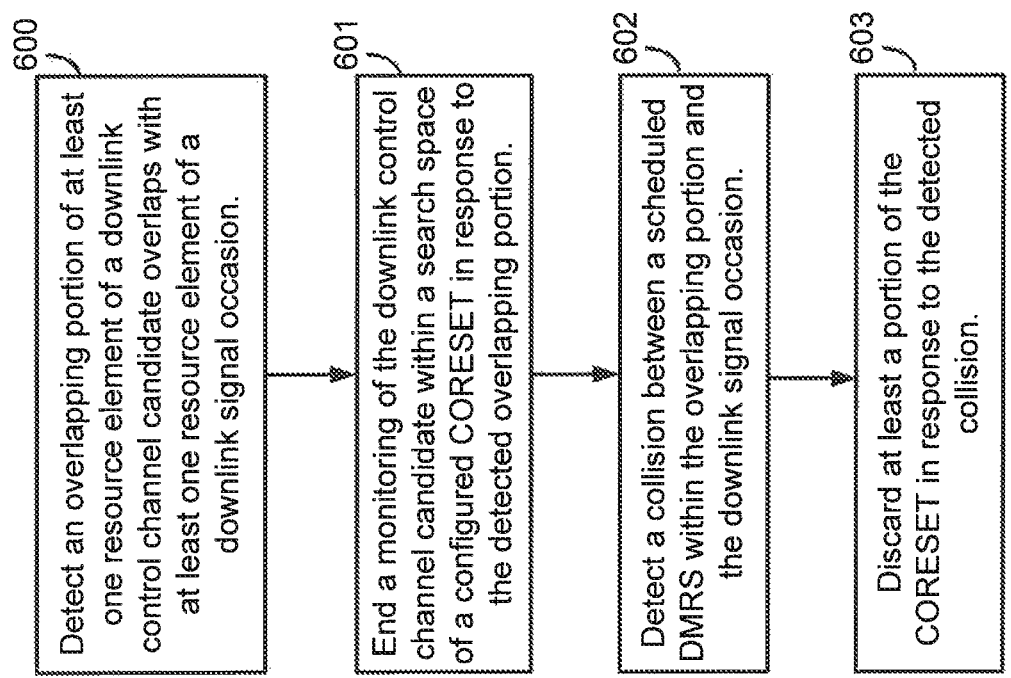
FIG. 6 is a block diagram illustrating example blocks executed to implement one aspect of the present disclosure.

FIG. 6 is a block diagram illustrating example blocks executed to implement one aspect of the present disclosure. The example blocks will also be described with respect to NR UE 115a as illustrated in FIG. 8. FIG. 8 is a block diagram illustrating NR UE 115a configured according to one aspect of the present disclosure. NR UE 115a includes the structure, hardware, and components as illustrated for UE 115 of FIG. 2. For example, NR UE 115a includes controller/processor 280, which operates to execute logic or computer instructions stored in memory 282, as well as controlling the components of NR UE 115a that provide the features and functionality of NR UE 115a. NR UE 115a, under control of controller/processor 280, transmits and receives signals via wireless radios 800a-r and antennas 252a-r. Wireless radios 800a-r includes various components and hardware, as illustrated in FIG. 2 for UE 115, including modulator/demodulators 254a-r, MIMO detector 256, receive processor 258, transmit processor 264, and TX MIMO processor 266.

At block 600, an NR UE detects an overlapping portion of at least one resource element of a downlink control channel candidate that overlaps with at least one resource element of a downlink signal occasion of either NR operations or a neighboring legacy RAT coexisting with the NR RAT. An NR cluster may be determined by an NR UE to overlap the LTE band based on multiple different considerations. For example, in a first alternative, an NR UE may determine an overlapping portion to include the portion in which NR DMRS RE(s) collide with NR SSB or LTE CRS RE(s). Alternatively, the NR UE may determine the overlapping portion to include the NR RB(s) that contain at least one demodulation reference signal (DMRS) RE that collides with an NR SSB or LTE CRS RE. Alternatively still, the NR UE may determine the overlapping portion to include segment(s) of contiguous NR RBs in which each such segment contains RBs defined by the precoder size parameter that have at least one DRMS RE which collides with an NR SSB or LTE-CRS RE. NR UE 115a, under control of controller/processor 280, executes signal overlap logic 804, stored in memory 282. The execution environment of signal overlap logic 804 controls NR UE 115a to detect the overlapping portion as described herein.

Because an NR PDCCH candidate occupies all control symbols within a search space set occasion of the CORESET, all symbols can be discarded as a result of one symbol being discarded for the PDCCH candidate. Therefore for channel estimation, an NR UE may also choose to discard all symbols over the frequency range corresponding to the overlapping portion, as defined in the various alternatives above.

The NR UE may further alternatively determine the overlapping portion as a set of NR DMRS RE(s) that collide with either NR SSB or LTE CRS RE(s), and then extend this set to also include NR DMRS RE(s) with a same set of RE indices in all of the symbols in the same search space set occasion. A further alternative option may provide for the NR UE to determine the overlapping portion as a set of NR RB(s) that contain at least one DMRS RE that collides with an NR SSB or LTE CRS RE, and then extend this set to include all of the NR RB(s) with a same set of RB indices in all of the symbols in the same search space set occasion. A further additional option may provide for the NR UE to determine the overlapping portion as a set of segment(s) of contiguous NR RBs in which each segment containing RBs that are defined by the precoder size parameter has at least one DRMS RE colliding with an NR SSB or LTE CRS RE, and then extending this set to include all NR RBs with a same set of RB indices as the segment(s) of contiguous NR RBs in all symbols in a same search space set occasion.

At block 601, the NR UE ends monitoring of the downlink control channel candidate within a search space of a configured CORESET in response to the detected overlapping portion. Once the NR UE detects or determines an overlapping portion in which some portion of the DMRS overlaps with a scheduled downlink signal, such as an LTE CRS, NR SSB, or the like, the NR UE may discontinue the blind decode monitoring of the PDCCH candidate and rate-match around the scheduled downlink signal. NR UE 115a, under control of controller/processor 280, executes signal overlap logic 804, stored in memory 282. The execution environment of signal overlap logic 804 controls NR UE 115a to end monitoring of the NR PDCCH candidate as described herein.

At block 602, the NR UE detects a collision between a scheduled NR DMRS within the overlapping portion and the downlink signal occasion. While the NR UE may stop monitoring the PDCCH candidate to rate-match around the downlink signal, there may still be scheduled, NR-based DMRS transmissions during the overlapping portion of the NR cluster. When a potential collision is detected between the scheduled NR DMRS and an LTE downlink signal, the NR DMRS and, at block 603, the NR UE discards at least a portion of the CORESET in response to the detected collision. NR UE 115a, under control of controller/processor 280, executes collision maintenance logic 805, stored in memory 282. The execution environment of collision maintenance logic 805 controls NR UE 115a to detect the detect the collision and discard at least the portion of the CORESET as described herein.

Figure 7:
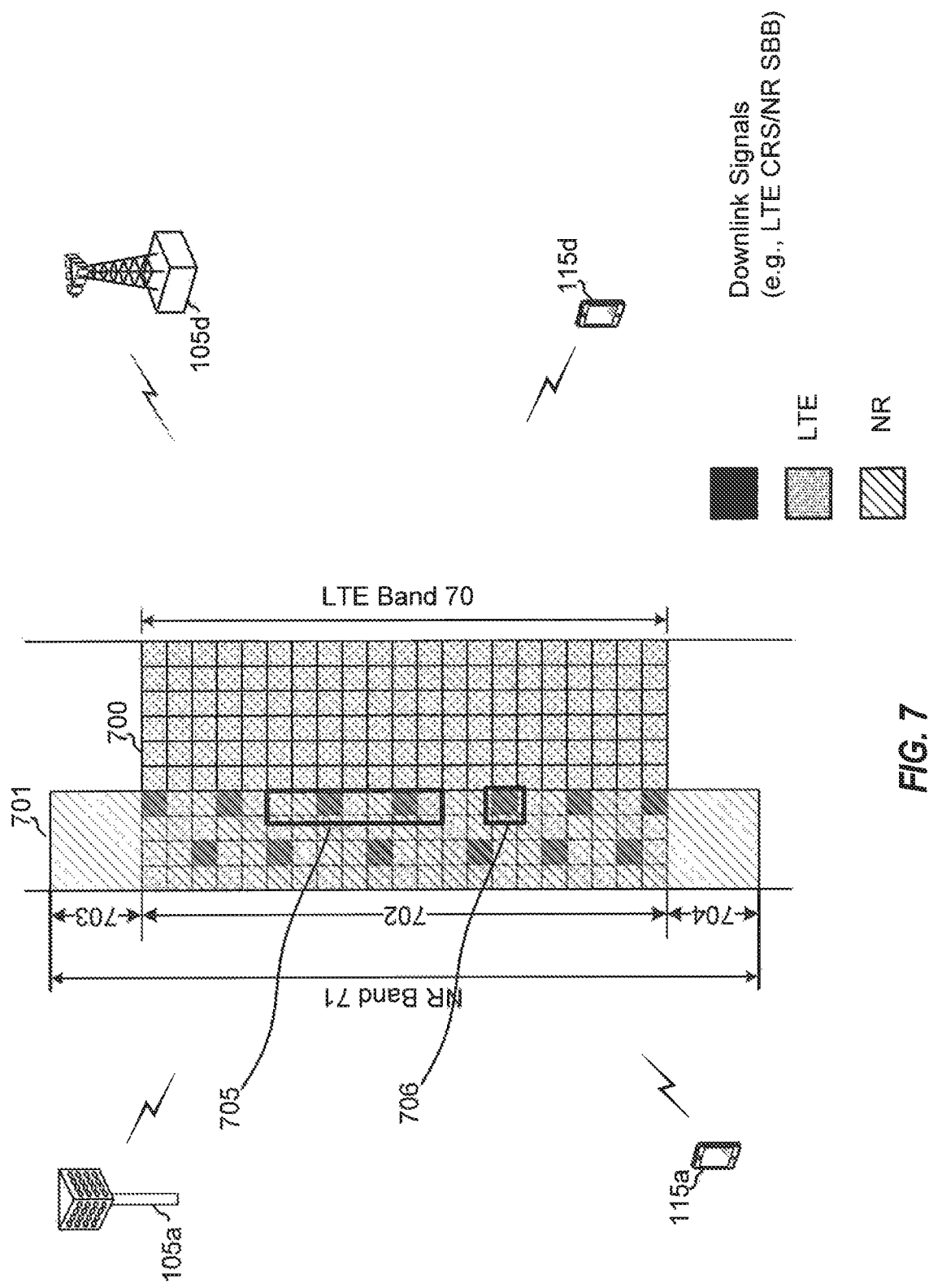
FIG. 7 is a block diagram illustrating an NR UE configured according to one aspect of the present disclosure.

FIG. 7 is a block diagram illustrating an NR UE 115a configured according to one aspect of the present disclosure. NR communications occur over NR band 71 between NR base station 105a and NR UE 115a, while LTE communications occur over LTE band 70 between legacy base station 105d and UE 115a. The NR and LTE operations coexist with sharing of downlink resources over the same band or component carrier. LTE transmissions 700 may occur over LTE REs while NR cluster 701 overlaps over a portion of LTE transmissions 700. LTE downlink signals (e.g., CRS, CSI-RS, etc.) may exist in LTE transmissions 700 that overlaps NR cluster 701 in overlapping portion 702. NR downlink signals (e.g., SSB) may also exist in overlapping portion 702 of NR cluster 701. Based on current operations, if there is any NR candidate, such as PDCCH candidate 705, within overlapping portion 701, and any of its REs collide with any downlink signals, NR candidate 705 may be discarded. However, DMRS 706 may also be scheduled over NR cluster 701. If DMRS 706 collides with NR SSB or LTE CRS on any RE, DMRS 706 will not be transmitted by NR base station 105a. Instead, base station 105d transmits the downlink signals resulting in any DMRS-based channel estimation being corrupted. In such a case, a first alternative solution provides for overlapping portion 702 of NR cluster 701 may be discarded. This, however, may create two clusters (clusters 703 and 704) out of a single previous cluster, which is not desirable. A second alternative solution provides for discarding all of NR cluster 701. A third alternative solution provides for an expectation that NR UE 115a is not configured with a cluster for which DMRS 706 collides with any downlink signaling, such as LTE CRS and/or NR SSB.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 4 and 6 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   detecting, by a user equipment (UE) operating according to a new radio (NR) radio access technology (RAT), an overlapping portion of at least one resource element of a downlink control channel candidate of a configured control resource set (CORESET) overlaps with at least one resource element of a downlink signal occasion of the NR RAT or a neighboring legacy RAT coexisting with the NR RAT;
   ending, by the UE, a monitoring of the downlink control channel candidate within a search space of the configured CORESET in response to the detected overlapping portion;
   detecting, by the UE, a collision between a scheduled demodulation reference signal (DMRS) within the overlapping portion and the downlink signal occasion; and
   discarding, by the UE, at least a portion of the CORESET in response to the detected collision.

2. The method of claim 1, wherein the detecting the overlapping portion includes one of:
   detecting at least one resource element of an NR scheduled DMRS colliding with the at least one resource element of the downlink signal occasion;
   detecting at least one NR resource block that includes at least one resource element of the NR scheduled DMRS colliding with the at least one resource element of the downlink signal occasion; or
   detecting one or more segments of a plurality of contiguous NR resource blocks that include at least one resource block defined by a precoder size parameter to have at least one resource element of the NR scheduled DMRS colliding with the at least one resource element of the downlink signal occasion.

3. The method of claim 2, wherein the detecting the at least one resource element of the NR scheduled DMRS includes:
   detecting at least one resource element of the NR scheduled DMRS colliding with the at least one resource element of the downlink signal occasion; and
   detecting the at least one resource element of the NR scheduled DMRS having a same set of resource element indices in all symbols within a same search space set occasion.

4. The method of claim 2, wherein the detecting the NR resource block includes:
   detecting the at least one NR resource block that includes the at least one resource element of the NR scheduled DMRS colliding with the at least one resource element of the downlink signal occasion; and
   detecting the at least one NR resource block having a same set of resource block indices in all symbols within a same search space set occasion.

5. The method of claim 2, wherein the detecting the NR resource block includes:
   detecting the one or more segments of the plurality of contiguous NR resource blocks that include the at least one resource block defined by the precoder size parameter to have the at least one resource element of the NR scheduled DMRS colliding with the at least one resource element of the downlink signal occasion; and
   detecting the at least one NR resource block having the same set of resource block indices as the one or more segments of the plurality of contiguous NR resource blocks in all symbols within a same search space set occasion.

6. The method of claim 1, wherein the discarding the at least a portion of the CORESET includes one of:
   discarding the overlapping portion; or
   discarding a cluster having the overlapping portion.

7. The method of claim 6, wherein a maximum number of clusters of resource blocks with contiguous DMRS resource elements across resource blocks fails to exceed a preconfigured maximum limit of clusters of contiguous resource blocks after the discarding the overlapping portion.

8. The method of claim 1, wherein the downlink signal occasion includes one of:
   a common reference signal of the legacy RAT; or
   a synchronization signal block of the NR RAT.

9. The method of claim 1, wherein the configured CORESET has a maximum number of clusters of resource blocks with contiguous DMRS resource elements such that no resource element of the downlink signal occasion candidate of the CORESET overlaps with any resource element of the downlink signal occasion.

10. An apparatus configured for wireless communication, comprising:
    means for detecting, by a user equipment (UE) operating according to a new radio (NR) radio access technology (RAT), an overlapping portion of at least one resource element of a downlink control channel candidate of a configured control resource set (CORESET) overlaps with at least one resource element of a downlink signal occasion of the NR RAT or a neighboring legacy RAT coexisting with the NR RAT;
    means for ending, by the UE, a monitoring of the downlink control channel candidate within a search space of the configured CORESET in response to the detected overlapping portion;
    means for detecting, by the UE, a collision between a scheduled demodulation reference signal (DMRS) within the overlapping portion and the downlink signal occasion; and
    means for discarding, by the UE, at least a portion of the CORESET in response to the detected collision.

11. The apparatus of claim 10, wherein the means for detecting the overlapping portion includes one of:
    means for detecting at least one resource element of an NR scheduled DMRS colliding with the at least one resource element of the downlink signal occasion;
    means for detecting at least one NR resource block that includes at least one resource element of the NR scheduled DMRS colliding with the at least one resource element of the downlink signal occasion; or
    means for detecting one or more segments of a plurality of contiguous NR resource blocks that include at least one resource block defined by a precoder size parameter to have at least one resource element of the NR scheduled DMRS colliding with the at least one resource element of the downlink signal occasion.

12. The apparatus of claim 11, wherein the means for detecting the at least one resource element of the NR scheduled DMRS includes:
    means for detecting at least one resource element of the NR scheduled DMRS colliding with the at least one resource element of the downlink signal occasion; and
    means for detecting the at least one resource element of the NR scheduled DMRS having a same set of resource element indices in all symbols within a same search space set occasion.

13. The apparatus of claim 11, wherein the means for detecting the NR resource block includes:
    means for detecting the at least one NR resource block that includes the at least one resource element of the NR scheduled DMRS colliding with the at least one resource element of the downlink signal occasion; and
    means for detecting the at least one NR resource block having a same set of resource block indices in all symbols within a same search space set occasion.

14. The apparatus of claim 11, wherein the means for detecting the NR resource block includes:
    means for detecting the one or more segments of the plurality of contiguous NR resource blocks that include the at least one resource block defined by the precoder size parameter to have the at least one resource element of the NR scheduled DMRS colliding with the at least one resource element of the downlink signal occasion; and
    means for detecting the at least one NR resource block having the same set of resource block indices as the one or more segments of the plurality of contiguous NR resource blocks in all symbols within a same search space set occasion.

15. The apparatus of claim 10, wherein the means for discarding the at least a portion of the CORESET includes one of:
    means for discarding the overlapping portion; or
    means for discarding a cluster having the overlapping portion.

16. The apparatus of claim 15, wherein a maximum number of clusters of resource blocks with contiguous DMRS resource elements across resource blocks fails to exceed a preconfigured maximum limit of clusters of contiguous resource blocks after the discarding the overlapping portion.

17. The apparatus of claim 10, wherein the downlink signal occasion includes one of:
a common reference signal of the legacy RAT; or
a synchronization signal block of the NR RAT.

18. A non-transitory computer-readable medium having program code recorded thereon, the program code comprising:
program code executable by a computer for causing the computer to detect, by a user equipment (UE) operating according to a new radio (NR) radio access technology (RAT), an overlapping portion of at least one resource element of a downlink control channel candidate of a configured control resource set (CORESET) overlaps with at least one resource element of a downlink signal occasion of the NR RAT or a neighboring legacy RAT coexisting with the NR RAT;
program code executable by the computer for causing the computer to end, by the UE, a monitoring of the downlink control channel candidate within a search space of the configured CORESET in response to the detected overlapping portion;
program code executable by the computer for causing the computer to detect, by the UE, a collision between a scheduled demodulation reference signal (DMRS) within the overlapping portion and the downlink signal occasion; and
program code executable by the computer for causing the computer to discard, by the UE, at least a portion of the CORESET in response to the detected collision.

19. The non-transitory computer-readable medium of claim 18, wherein the program code executable by the computer for causing the computer to detect the overlapping portion includes one of:
program code executable by the computer for causing the computer to detect at least one resource element of an NR scheduled DMRS colliding with the at least one resource element of the downlink signal occasion;
program code executable by the computer for causing the computer to detect at least one NR resource block that includes at least one resource element of the NR scheduled DMRS colliding with the at least one resource element of the downlink signal occasion; or
program code executable by the computer for causing the computer to detect one or more segments of a plurality of contiguous NR resource blocks that include at least one resource block defined by a precoder size parameter to have at least one resource element of the NR scheduled DMRS colliding with the at least one resource element of the downlink signal occasion.

20. The non-transitory computer-readable medium of claim 19, wherein the program code executable by the computer for causing the computer to detect the at least one resource element of the NR scheduled DMRS includes:
program code executable by the computer for causing the computer to detect at least one resource element of the NR scheduled DMRS colliding with the at least one resource element of the downlink signal occasion; and
program code executable by the computer for causing the computer to detect the at least one resource element of the NR scheduled DMRS having a same set of resource element indices in all symbols within a same search space set occasion.

21. The non-transitory computer-readable medium of claim 19, wherein the program code executable by the computer for causing the computer to detect the NR resource block includes:
program code executable by the computer for causing the computer to detect the at least one NR resource block that includes the at least one resource element of the NR scheduled DMRS colliding with the at least one resource element of the downlink signal occasion; and
program code executable by the computer for causing the computer to detect the at least one NR resource block having a same set of resource block indices in all symbols within a same search space set occasion.

22. The non-transitory computer-readable medium of claim 19, wherein the program code executable by the computer for causing the computer to detect the NR resource block includes:
program code executable by the computer for causing the computer to detect the one or more segments of the plurality of contiguous NR resource blocks that include the at least one resource block defined by the precoder size parameter to have the at least one resource element of the NR scheduled DMRS colliding with the at least one resource element of the downlink signal occasion; and
program code executable by the computer for causing the computer to detect the at least one NR resource block having the same set of resource block indices as the one or more segments of the plurality of contiguous NR resource blocks in all symbols within a same search space set occasion.

23. The non-transitory computer-readable medium of claim 18, wherein the program code executable by the computer for causing the computer to discard the at least a portion of the CORESET includes one of:
program code executable by the computer for causing the computer to discard the overlapping portion; or
program code executable by the computer for causing the computer to discard a cluster having the overlapping portion.

24. The non-transitory computer-readable medium of claim 23, wherein a maximum number of clusters of resource blocks with contiguous DMRS resource elements across resource blocks fails to exceed a preconfigured maximum limit of clusters of contiguous resource blocks after the discarding the overlapping portion.

25. The non-transitory computer-readable medium of claim 18, wherein the downlink signal occasion includes one of:
a common reference signal of the legacy RAT; or
a synchronization signal block of the NR RAT.

26. An apparatus configured for wireless communication, the apparatus comprising:
at least one processor; and
a memory coupled to the at least one processor,
wherein the at least one processor is configured to:
detect, by a user equipment (UE) operating according to a new radio (NR) radio access technology (RAT), an overlapping portion of at least one resource element of a downlink control channel candidate of a configured control resource set (CORESET) overlaps with at least one resource element of a downlink signal occasion of the NR RAT or a neighboring legacy RAT coexisting with the NR RAT;
end, by the UE, a monitoring of the downlink control channel candidate within a search space of the configured CORESET in response to the detected overlapping portion;

detect, by the UE, a collision between a scheduled demodulation reference signal (DMRS) within the overlapping portion and the downlink signal occasion; and discard, by the UE, at least a portion of the CORESET in response to the detected collision.

27. The apparatus of claim 26, wherein the wherein the at least one processor is configured to detect the overlapping portion by one of:

detecting at least one resource element of an NR scheduled DMRS colliding with the at least one resource element of the downlink signal occasion;

detecting at least one NR resource block that includes at least one resource element of the NR scheduled DMRS colliding with the at least one resource element of the downlink signal occasion; or detecting one or more segments of a plurality of contiguous NR resource blocks that include at least one resource block defined by a precoder size parameter to have at least one resource element of the NR scheduled DMRS colliding with the at least one resource element of the downlink signal occasion.

28. The apparatus of claim 27, wherein the wherein the at least one processor is configured to detect the at least one resource element of the NR scheduled DMRS by:

detecting at least one resource element of the NR scheduled DMRS colliding with the at least one resource element of the downlink signal occasion; and detecting the at least one resource element of the NR scheduled DMRS having a same set of resource element indices in all symbols within a same search space set occasion.

29. The apparatus of claim 27, wherein the wherein the at least one processor is configured to detect the NR resource block by:

detecting the at least one NR resource block that includes the at least one resource element of the NR scheduled DMRS colliding with the at least one resource element of the downlink signal occasion; and detecting the at least one NR resource block having a same set of resource block indices in all symbols within a same search space set occasion.

30. The apparatus of claim 27, wherein the wherein the at least one processor is configured to detect the NR resource block by:

detecting the one or more segments of the plurality of contiguous NR resource blocks that include the at least one resource block defined by the precoder size parameter to have the at least one resource element of the NR scheduled DMRS colliding with the at least one resource element of the downlink signal occasion; and detecting the at least one NR resource block having the same set of resource block indices as the one or more segments of the plurality of contiguous NR resource blocks in all symbols within a same search space set occasion.

31. The apparatus of claim 27, wherein the wherein the at least one processor is configured to discard the at least a portion of the CORESET by one of:

discarding the overlapping portion; or discarding a cluster having the overlapping portion.

32. The apparatus of claim 31, wherein a maximum number of clusters of resource blocks with contiguous DMRS resource elements across resource blocks fails to exceed a preconfigured maximum limit of clusters of contiguous resource blocks after the discarding the overlapping portion.

33. The apparatus of claim 26, wherein the downlink signal occasion includes one of:

a common reference signal of the legacy RAT; or a synchronization signal block of the NR RAT.

* * * * *